Reissued Sept. 1, 1953 Re. 23,703

UNITED STATES PATENT OFFICE 23,703

AMINO-COUMARIN-SULFONATES

Franz Ackermann, Binningen, Switzerland, assignor to Ciba Limited, Basel, Switzerland, a Swiss firm No Drawing. Original No. 2,600,375, dated June 17, 1952, Serial No. 752,277, June 3, 1947. Application for reissue January 26, 1953, Serial No. 333,397. In Switzerland June 14, 1946

8 Claims. (Cl. 260—343.2)

Matter enclosed in heavy brackets [ ] appears in the original patent but forms no part of this reissue specification; matter printed in italics indicates the additions made by reissue.

According to this invention new water-soluble coumarin derivatives are obtained by introducing acid or ion-inactive (non-ionic) groups into compounds of the general formula:

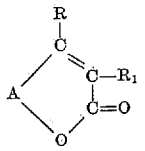

in which A represents an aromatic nucleus of which two vicinal carbon atoms form part of the unsaturated lactone ring, and which nucleus may contain substituents, R and $R_1$ represent hydrogen or an alkyl, aryl or aralkyl radical, which may contain substituents, and in which at least one of the radicals A, R and $R_1$ contains at least one amino group which may contain substituents.

The term "acid groups" denotes sulfonic acid, acid sulfuric acid ester or carboxyl groups. As is known, ion-inactive or non-ionic groups imparting solubility in water form in water neither anions nor cations. Examples of such groups are polyglycol ether radicals which may be introduced by the action of ethylene oxide, further polyglycerine radicals which may be introduced easily, for example, with glycide. The most important groups among the ion-inactive atom groupings imparting solubility in water, however, are polyglycol ether radicals. The above mentioned acid and ion-inactive groups imparting solubility in water may also be designated as groups imparting solubility in water which are free from basic nitrogen atoms, such as are present, for example, in quaternary ammonium groups. Substituted amino groups are, for example, groups in which at least one hydrogen atom is replaced by hydrocarbon radicals, such as alkyl, aryl and aralkyl radicals, or further by acyl radicals, for example, carboxylic acid radicals.

As is known, basic amino groups contain at the nitrogen atom only hydrogen atoms or hydrocarbon radicals which may be substituted, but are free from acyl radicals.

The compounds of the above formula and also their water-soluble salts and derivatives do not possess the character of dyestuffs, produce in aqueous solution a blue to violet fluorescence in ultra-violet light and have a more or less pronounced affinity towards a very wide variety of substrata. Owing to these properties the products of this invention are suitable for improving materials, especially fibrous materials, which products when applied to the materials improve the whiteness of undyed materials and the purity of color of dyed materials. In the case of undyed, originally yellowish materials the improvement in whiteness becomes apparent by the fact that the applied compound producing a blue to violet fluorescence imparts a white appearance to the originally yellowish material.

As compounds of the above general formula which may be produced in accordance with the present invention there may be mentioned, for example, the following compounds, all of which are obtainable by the action of a solubilizing agent capable of introducing a solubilizing group free from basic nitrogen atoms:

(A) Compounds of the formula

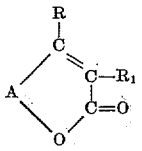

wherein R and $R_1$ have the significance given in the first paragraph of the specification, and wherein A, R or $R_1$ contains the atom grouping

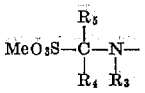

for example, products of the formula

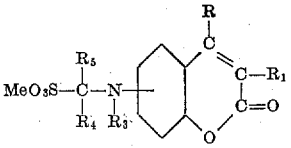

in which R and $R_1$ represent hydrogen or an alkyl, aryl or aralkyl radical, which may contain substituents, $R_3$ represents hydrogen or a substituent, for example, an alkyl, aralkyl or aryl radical, $R_4$ and $R_5$ represent hydrogen or a hydrocarbon radical, for example, an alkyl radical, which may contain substituents, and Me represents a cation. Compounds of this kind are obtained from a corresponding amino coumarin of the formula:

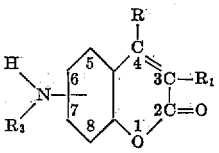

in which R, $R_1$ and $R_3$ have the meanings given above, by treating it with an aldehyde-bisulfite or ketone-bisulfite compound or with an aldehyde or ketone and sulfur dioxide. In this formula the customary manner of designating coumarins has been indicated. By treatment with a formaldehyde-bisulfite compound, for example, by heating the appropriate amino coumarin with an aqueous solution of sodium formaldehyde bisulfite a compound of the formula

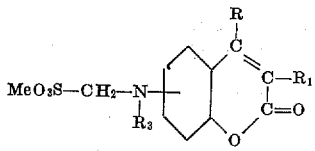

is obtained, in which R, $R_1$ and $R_3$ and Me have the meanings given above. Instead of formaldehyde-bisulfite compounds there may be allowed to act in a similar manner bisulfite compounds of other aldehydes, such as acetaldehyde, acrolein, benzaldehyde or furfurol, or bisulfite compounds of etones, such as acetophenone. Especially valuable, however, are the water-soluble salts, obtainable with formaldehyde bisulfite, of compounds of the formula

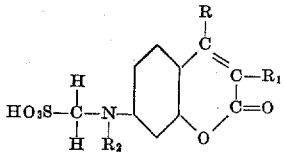

wherein R and $R_1$ have the meaning given above, and $R_2$ stands for hydrogen or alkyl.

(B) Compounds of the above mentioned general formula

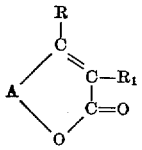

in which A, R or $R_1$ contains a sulfonic acid or sulfuric acid ester group. Such sulfonic acids are obtained by treating an appropriate amino coumarin compound with a suitable sulfonating agent which replaces a hydrogen atom by an —$SO_3H$ group, such as concentrated sulfuric acid, chloro-sulfonic acid, or sulfuric acid containing sulfur trioxide. Especially easy to prepare are sulfonic acids of amino coumarin of the formula

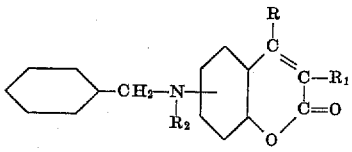

in which R, $R_1$ and $R_2$ represent hydrogen or an alkyl, aryl or aralkyl radical. By treating such benzylated amino coumarins with concentrated sulfuric acid, which may, if desired, contain additional sulfur trioxide, the corresponding sulfonic acids are obtained. In a similar manner amino coumarins containing the atomic grouping

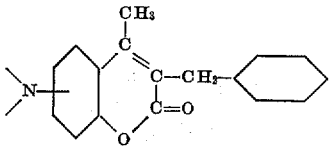

or other amino coumarins, such as 4-methyl-7-ethylamino-coumarin, may be sulfonated.

Amino coumarins which contain as a substituent in the amino group an alkyl or aralkyl radical containing a sulfonic acid group can also be obtained by treating an appropriate amino coumarin with a halogenated alkyl sulfonic acid or a sulfonated aralkyl halide, which like β-bromethane sulfonic acid or benzyl chloride-para-sulfonic acid contains a reactive halogen atom, if desired, in the presence of an acid-binding agent. The above mentioned halogenated alkyl sulfonic acids or sulfonated aralkyl halides contain a halogen atom bound to an aliphatic chain. When the amino coumarin used as starting material contains a tertiary amino group a quaternary ammonium compound is formed by the action of the aforesaid halogen-sulfonic acid. Sulfuric acid esters can be obtained by treating with a sulfonating agent an amino coumarin containing an hydroxyalkyl group, for example, an amino coumarin of the general formula

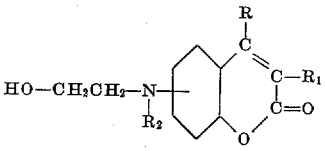

in which R, $R_1$ and $R_2$ have the meanings given above. The N-hydroxy-ethylamino-coumarins used as starting materials are easily obtained with the aid of ethylene oxide or ethylene chlorhydrin.

(C) Compounds of the above mentioned general formula

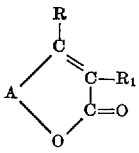

in which A, R or $R_1$ contains the group

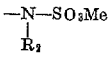

($R_2$=hydrogen, alkyl, aryl or aralkyl, and Me=a cation). Such sulfamic acids can be obtained from coumarins having primary or secondary amino groups, for example, by treatment with the addition product of pyridine with sulfur trioxide, advantageously in the presence of an excess of pyridine.

(D) Compounds of the above formula

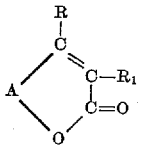

in which an amino group present in A, R or $R_1$ contains as a substituent an alkyl or aralkyl radical containing a carboxyl group. Such carboxylic acids are obtainable by the reaction of an appropriate amino coumarin with an aliphatic halogen-carboxylic acid, such as chloracetic acid, α-chloropropionic acid, α-bromosuccinic acid, or with an aralkyl halide containing in the aryl residue a carboxyl group, such as chloromethyl-benzoic acid or chloromethyl-salicylic acid. In this reaction, which may be carried out, for example, at 60–100° C., an acid-binding agent may be present.

(E) Condensation products of an amino coumarin of the above mentioned general formula

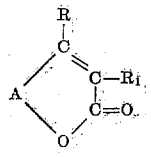

which contains a primary amino group in A, R or $R_1$, with a carbonyl compound which contains at least one group imparting solubility in water or an atomic grouping convertible into a group imparting solubility in water. Examples of such carbonyl compounds are: Aldehyde or ketone sulfonic acids, such as acetaldehyde disulfonic acid, benzaldehyde disulfonic acid or acetone sulfonic acid; aldehyde or ketone carboxylic acids, such as glyoxylic acid; and furthermore polyoxy-aldehydes such as reducing sugars, for example, l-arabinose, d-glucose, d-fructose or maltose. As an example of a carbonyl compound containing an atomic grouping convertible into a group imparting solubility in water there may be mentioned crotonaldehyde, which, after the condensation, can easily be additively combined at the double bond with bisulfite, for example. The condensation may be carried out, for example, by heating the components, for example, at 80–100° C., in the presence of a suitable solvent, for example, with the addition of a mixture of alcohol and glacial acetic acid.

(F) Condensation products of an amino coumarin of the above mentioned general formula

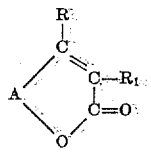

which contains a primary or secondary amino group in A, R or $R_1$, with an N-methylol-amide of a carboxylic acid containing at least one group imparting solubility in water or with a mixture of formaldehyde and an amide of a carboxylic acid of the aforesaid kind. The N-methylol-carboxylic acid amides or carboxylic acid amides may be derived, for example, from the following carboxylic acids: carboxylic acids containing quaternary ammonium groups, for example, addition products of tertiary amines with aliphatic halogen-carboxylic acids, for example, with chloracetic acid, α-chloropropionic acid, and also chloromethylated aromatic carboxylic acids such, for example, as chloromethyl-benzoic acid; sulfo-carboxylic acids such as sulfo-acetic acid or meta-sulfobenzoic acid. The above mentioned condensation products can be obtained, for example, by heating the components, for example at 80–100° C. advantageously in the presence of a suitable solvent, for example, with the addition of alcohol.

(G) Compounds of the above general formula

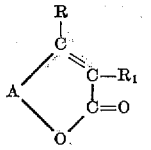

in which the amino group present in A, R or $R_1$ contains at least one polyglycol ether residue. Such products are easily obtainable by the action of ethylene oxide, for example, in the presence of a solvent such as dioxane, advantageously at a raised temperature, for example, at 60–100° C.

(H) Compounds of the formula

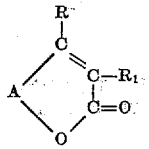

wherein R and $R_1$ have the significance given in the first paragraph of the specification, and wherein A, R or $R_1$ contains the atom grouping

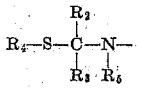

for example, products of the formula

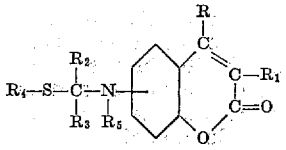

in which R, $R_1$, $R_2$, $R_3$ and $R_5$ represent hydrogen or an alkyl, aryl or aralkyl radical, which may contain substituents, and $R_4$ represents an alkyl, aryl or aralkyl radical, which may contain substituents. Such products are easily obtainable from amino coumarins having primary or secondary amino groups by condensation with mercapto-compounds in the presence of aldehydes or acetals thereof. As a mercapto-compound there is advantageously used thioglycollic acid. However, other mercaptans, for example β-hydroxyethylmercaptan or thiosalicylic acid, may also be employed. There may be used as aldehydes in the above mentioned condensation, for example, formaldehyde, acetaldehyde or benzaldehyde, and furthermore aldehydes having a group imparting solubility in water, such as glyoxylic acid, acetaldehyde disulfonic acid or a benzaldehyde sulfonic acid. The above mentioned condensation is advantageously conducted at a raised temperature, for example, 60–100° C., if desired, in the presence of a solvent such as methanol, dioxane or glacial acetic acid. Acids which are capable of acting as catalysts, such as acetic acid or hydrochloric acid, may be added, when the solvent used is not itself an acid. The individual starting materials may be brought into reaction simultaneously or in succession.

(I) Water-soluble salts of compounds of the formula

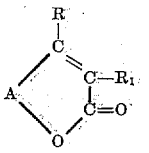

wherein R and $R_1$ have the significance given in the first paragraph of the specification, and wherein A, R or $R_1$ contains the atom grouping

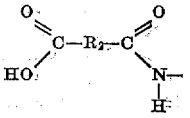

for example, products of the formula

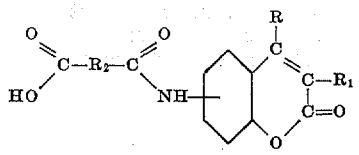

in which R and $R_1$ represent hydrogen or an alkyl, aryl or aralkyl radical, which may contain substituents, and

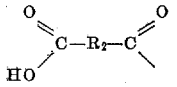

represents the monovalent acyl residue of a dicarboxylic acid. Such amide-acids are easily obtainable from amino coumarins having primary or secondary amino groups by heating them with the dicarboxylic acids or advantageously with anhydrides thereof, for example, with succinic anhydride, maleic anhydride or phthalic anhydride, advantageously in the presence of a solvent such as dioxane or benzene.

The products of the invention may be designated as amino coumarin derivatives which form aqueous solutions showing fluorescence in ultraviolet light and which contain a water-solubilizing group free from basic nitrogen atoms, said amino coumarins corresponding to the formula

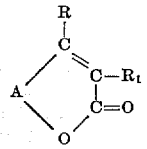

wherein A is a radical of the benzene series in which two vicinal carbon atoms are members of the unsaturated lactone ring, R and $R_1$ are members selected from the group consisting of hydrogen, alkyl, aryl and aralkyl, at least one of the radicals A, R and $R_1$ containing a member selected from the group consisting of primary amino groups, secondary amino groups, tertiary amino groups and acylated amino groups.

The improvement of the materials in accordance with the invention may be carried out by impregnating the material to be improved with a solution, for example, an aqueous solution, or a dispersion of one of the compounds hereinbefore described, and, after centrifuging or squeezing the material, drying it. Derivatives of products of the aforesaid general formula which contain acid groups are advantageously applied in the form of aqueous solutions of their metal salts. Besides the above mentioned aqueous solutions, there also come into consideration for use in the improving process of the invention solutions in organic solvents. It is also possible to treat materials with the compounds of the general formula hereinbefore first mentioned in dispersed form, for example, with dispersions which are obtained by means of dispersing agents such as soaps, soap-like substances, polyglycol ethers of fatty alcohols, sulfite cellulose waste liquor or condensation products of, if desired, alkylated, naphthalene sulfonic acids with formaldehyde.

The compounds of the present invention may also be applied in the course of the manufacture of the material to be improved. In this case the compound may be added, for example, to a paper mass or a viscose solution which is to be used for making films or filaments, or to another spinning mass, for example, to a spinning mass of a linear synthetic polyamide or an acetyl-cellulose spinning solution.

The products of the invention may also be added, for example, to liquors used for imparting a crease resistant finish. They are also suitable for the after-treatment of discharge prints.

In general small quantities of the products of the invention suffice to produce the improvement.

The compounds of this invention may also be used in admixture with auxiliary substances of the kind used for improving fibrous materials, for example, together with washing agents (for example, soaps, salts of sulfonated washing agents, such as salts of sulfonated benzimidazoles containing as a substituent at the 2-carbon atom a higher alkyl radical, mono-carboxylic acid esters of 4-sulfophthalic acid with higher fatty alcohols, fatty alcohol sulfonates or condensation products of higher fatty acids with aliphatic hydroxy- or aminosulfonic acids). In this manner the material to be improved can be simultaneously washed and bleached. An especially pronounced brightening effect is produced when undyed animal fibers, especially wool, are treated with mixtures containing such washing agents.

As materials which can be improved with the products of the invention, there may be mentioned, for example, the following:

Nitrogenous natural or artificial materials such as wool, silk or synthetic polyamide fibers; also cellulose materials such as cellulose, paper or textile materials of cotton, linen or regenerated cellulose including regenerated cellulose staple fibers; and finally materials produced synthetically for example, by polymerization. However, the best effects are produced by the present process on animal fibers. The material to be improved may be in any desired form, for example, in fibrous form or in the form of film. Moreover, the material may, for example, be undyed, dyed or printed. Metal surfaces which are pretreated in a suitable manner, for example, anodically oxidized aluminium sheeting, may also be treated in accordance with the invention.

The following examples illustrate the invention the parts being by weight unless otherwise stated, and the relationship of parts by weight to parts by volume being the same as that of the kilogram to the liter:

Example 1

A formaldehyde-bisulfite solution is prepared from 52 parts of a sodium bisulfite solution of 40 per cent. strength and 16.2 parts of an aqueous formaldehyde solution of 37 per cent. strength. 12 parts of 4-methyl-7-amino-coumarin are added and the whole is boiled in a reflux apparatus until all the 4-methyl-7-amino-coumarin is dissolved, which requires 4–5 hours. The whole is allowed to cool, whereupon the condensation product precipitates. Portions still remaining in solution can be precipitated by the addition of a salting-out agent, for example, a solution of sodium chloride. The whole is filtered, the residue is washed if necessary with sodium chloride solution, and dried.

A bright powder is obtained, viz., the sodium salt of the acid of the formula

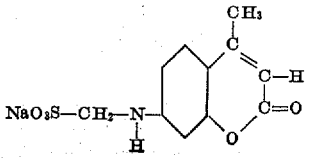

which is soluble in water. Its solutions produce a blue-violet fluorescence. Wool or cotton which has been treated with an aqueous solution thereof has a greater whiteness than the untreated material.

Example 2

520 parts of sodium bisulfite solution of 40 per cent. strength are mixed with 162 parts of formaldehyde solution of 37 per cent. strength, and 1 part of sodium carbonate and 60 parts of 4-methyl-7-ethyl-amino-coumarin are added to the mixture. The whole is maintained at 115–120° C. in a pressure vessel for 8–12 hours. It is then allowed to cool, and, if desired, filtered to remove small quantities of undissolved constituents, and the filtrate is evaporated to dryness at 50–70° C. under reduced pressure. When carrying out the reaction at about 100° C. it lasts considerably longer.

A slightly yellowish powder is obtained which can be freed from salts to a considerable extent by extraction with methanol. The new product of the formula

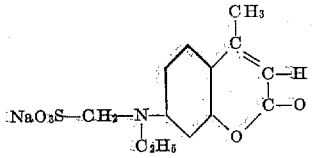

is a bright powder which is soluble in water. Its solutions produce a blue-violet fluorescence. Wool which has been treated with such a solution possesses greater whiteness than the untreated wool.

Instead of formaldehyde there may also be used acetaldehyde for the above described reaction.

Example 3

A benzaldehyde-bisulfite solution is prepared from 26 parts of a sodium bisulfite solution of 40 per cent strength, 10.6 parts of benzaldehyde and 50 parts of water, and the solution is rendered weakly alkaline by the addition of an aqueous solution of sodium carbonate. 3 parts of 4-methyl-7-aminocoumarin are added and the whole is boiled for 1 hour in a reflux apparatus. The resulting solution is evaporated to dryness. A water-soluble bright powder of the formula

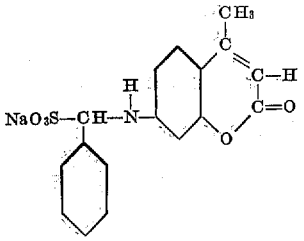

is obtained. Its solutions produce a bluish fluorescence.

4-methyl-7-amino-coumarin may be treated in a similar manner with a solution of cinnamaldehyde-bisulfite or of salicylaldehyde-bisulfite. The water-soluble powders so obtained have properties similar to those of the compound obtained with benzaldehyde.

Example 4

3.5 parts of 4-methyl-7-amino-coumarin and 4.6 parts of sodium benzyl chloride-4-sulfonate are boiled in 50 parts of ethyl alcohol. The hydrochloric acid formed is neutralized with a solution of 1.3 parts of sodium carbonate in 5 parts of water in such manner that a very weakly acid reaction persists throughout. After about 18 hours the whole is evaporated to dryness, a small quantity of 4-methyl-7-amino-coumarin still present is dissolved out with chlorobenzene, and the residue is again dried.

A bright powder of the formula

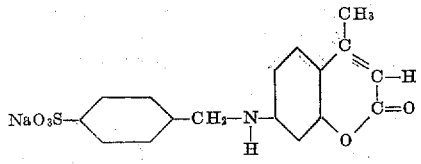

is obtained which is soluble in water. Its solutions produce a bluish fluorescence.

Example 5

17 parts of 4-methyl-7-amino-coumarin, 35 parts of sodium benzaldehyde 2:4-disulfonate, 500 parts of ethyl alcohol and 500 parts of glacial acetic acid are boiled for 4 hours. The resulting solution is evaporated to dryness at 40–50° C. under reduced pressure. Any small quantity of 4-methyl-7-amino-coumarin still present may be dissolved out with benzene.

A powder of the probable formula

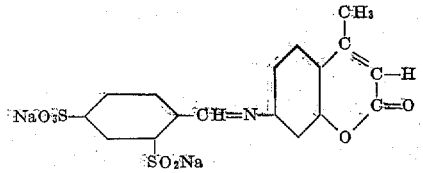

is obtained which is soluble in water. Its solutions produce a bluish fluorescence.

Example 6

9 parts of chlorosulfonic acid followed by 4 parts of 4-methyl-7-amino-coumarin are added to 50 parts of pyridine at a temperature below 40° C. The temperature is increased to the boiling point and the whole is maintained at a gentle boil until a test portion becomes soluble in water, which requires 1–2 hours. The whole is then allowed to cool, poured into water, neutralized with sodium carbonate, and the liquid is evaporated to dryness at 40–50° C. under reduced pressure. The reaction product can be freed from inorganic salts to a considerable extent by extraction with methanol. The product is a bright powder of the formula

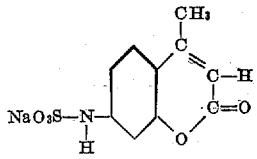

which dissolves in water to give a blue-violet fluorescence.

Example 7

35 parts of 4-methyl-7-amino-coumarin are boiled in a reflux apparatus for 24 hours with 12 parts of benzyl chloride and 400 parts of ethyl alcohol. After cooling, the whole is filtered, the residue is washed with alcohol and then stirred with hydrochloric acid of 5 per cent strength in order to remove unchanged starting material. The whole is filtered, and the residue is washed with water, dried and crystallized from alcohol.

Bright crystals are obtained which are insoluble in water.

5 parts of the compound so obtained are dissolved in 30 parts of sulfuric acid monohydrate, and the whole is stirred at 70–75° C. until a test portion is soluble in dilute sodium carbonate solution. The whole is then cooled, poured on to ice, neutralized with caustic soda solution, and evaporated to dryness at 60–80° C. under reduced pressure. The powder so obtained is extracted with hot methanol, and the extract solution is evaporated to dryness.

A bright powder of the formula

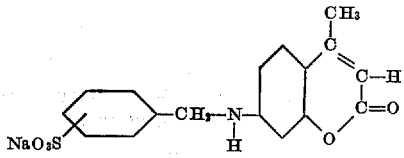

is obtained which is soluble in water. Its solutions produce a bluish fluorescence.

Example 8

4 parts of 4-methyl-7-(dimethylamino)-coumarin, 6 parts of sodium benzyl chloride-para-sulfonate and 40 parts of ethyl alcohol are boiled in a reflux apparatus for a few hours and then allowed to cool. The precipitated condensation product is removed by filtration, washed with alcohol and dried. In order to remove a small quantity of 4-methyl-7-(dimethylamino)-coumarin still present the powder so obtained is digested with benzene, the solution is filtered, and the residue is washed with benzene and dried.

A bright powder is obtained which is soluble in water. Its solutions produce a bluish fluorescence in ultraviolet light.

Example 9

4 parts of 4-methyl-7-(ethyl-benzylamino)-coumarin are dissolved at room temperature in 50 parts of sulfuric acid monohydrate. 8 parts of fuming sulfuric acid containing 24 per cent of sulfur trioxide are slowly added dropwise to the solution which is cooled to 0° C. As soon as a test portion is soluble in dilute sodium carbonate solution the sulfonation mixture is poured on to ice, neutralized with caustic soda solution, evaporated to dryness, and extracted with methanol to remove inorganic salts. The extract solution is then evaporated to dryness.

A powder of the formula

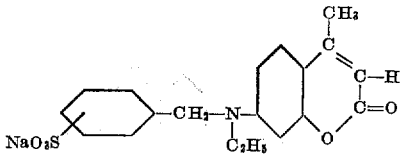

is obtained which dissolves in water to give a bluish fluorescence.

Example 10

6 parts of 4-methyl-7-amino-coumarin are maintained at the gentle boil with 50 parts of ethyl alcohol and 8 parts of the quaternary addition product of trimethylamine with methylol chloracetamide for 15 hours. The alcohol is removed by distillation, the residue is treated with benzene in order to remove a small quantity of starting material still present, and dried. The resulting powder is, if necessary, dissolved in water, freed from small quantities of solid impurities by filtration, and the filtrate is evaporated to dryness at a low temperature under reduced pressure. A bright powder is obtained which is soluble in water. Its solutions produce a violet-blue fluorescence.

Example 11

3.5 parts of 4-methyl-7-amino-coumarin are added to a solution of 3 parts of mono-chloracetic acid, 2.6 parts of sodium carbonate and 30 parts of water. The whole is stirred for 15 hours at 70–90° C., allowed to cool, neutralized with dilute sulfuric acid, if necessary, filtered to remove unchanged starting material still present, and the filtrate is evaporated to dryness.

A bright powder of the formula

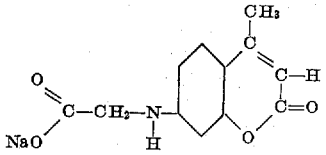

is obtained which is soluble in water. Its solutions produce a violet-blue fluorescence.

Example 12

6 parts of 4-methyl-7-amino-coumarin are suspended in 70 parts of dioxane at 70–80° C., and then ethylene oxide is introduced. After about 4 hours the temperature is raised to 100° C., and ethylene oxide is introduced until a test portion in soluble in water. The reaction product, when freed from easily volatile constituents, is a bright powder of the formula

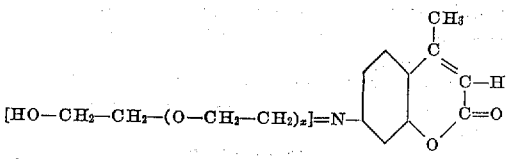

which dissolves in water. Its solutions produce a violet-blue fluorescence.

Example 13

7 parts of phenyl isocyanate dissolved in 7 parts of chlorobenzene are introduced dropwise into a solution of 8.5 parts of 4-methyl-7-amino-coumarin in 400 parts of chlorobenzene. The whole is then heated at the boil for 1 hour and allowed to cool. The precipitated condensation product is separated by filtration, washed with chlorobenzene and benzene until it is free from a small quantity of unchanged starting material, and then dried.

A powder is obtained which is insoluble in water.

1 part of the powder is dissolved in 10 parts of sulfuric acid monohydrate at 0–5° C., 5 parts of fuming sulfuric acid containing 24 per cent of sulfur trioxide are then added dropwise. The whole is stirred at 0–5° C. until a test portion is soluble in dilute sodium carbonate solution, and then poured on to ice. The precipitated sulfonic acid is separated by filtration, stirred with water, converted into its sodium salt by means of caustic soda solution, and the resulting solution is evaporated to dryness.

A bright powder of the formula

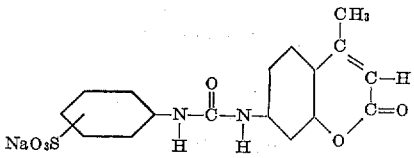

is obtained which is soluble in water. Its solutions produce a bluish-violet fluorescence in ultraviolet light.

Water-soluble products having similar properties are obtained by sulfonating 6-benzoyl amino-coumarin or 3-(para-acetyl-amino-phenyl)-coumarin.

Example 14

Wool cloth is treated at 40–50° C. for ¼–½ hour at a liquor ratio of 1:40 in a bath containing, per liter, 0.2 gram of the product obtained as described in Example 1 and 1 gram of concentrated sulfuric acid. The goods are then rinsed and dried.

The wool has a greater whiteness than the untreated material.

A similar effect is obtained by using instead of the product obtained as described in Example 1 0.2 gram of the powder obtained as described in Example 2.

Example 15

Wool cloth is treated for ¼ hour at 40–50° C. in a bath containing, per liter of water, 0.1 gram of 4-methyl-7-ethyl-amino-coumarin dissolved in 50 grams of sulfuric acid of 2 per cent strength. The liquor ratio is 1:40. The material is then rinsed and dried.

The wool has a greater whiteness than the untreated material.

A similar effect is obtained by using 4-methyl-7-dimethylamino-coumarin instead of 4-methyl-7-ethyl-amino-coumarin.

Example 16

100 grams of wool are washed for ½ hour at 50–55° C. in 4 liters of water which contain 0.16 gram of 4-methyl-7-dimethylamino-coumarin dissolved in 32 grams of sulfuric acid of 2 per cent strength, and 8 grams of the sodium salt of μ-heptadecyl-N-benzyl-benzimidazole disulfonic acid.

The washed wool has a whiter appearance than wool which has been washed without the addition of 4-methyl-7-dimethylamino-coumarin.

A similar result is obtained by using, for example, 4-methyl-7-ethylamino-coumarin, instead of 4-methyl-7-dimethylamino-coumarin.

Example 17

Wool is washed at 40–50° C. in a bath containing, per liter, 1 gram of the disodium salt of N-benzyl-μ-heptadecyl-benzimidazole disulfonic acid, a small quantity of sodium sulfate and 0.05 gram of the product obtained as described in Example 2, rinsed and dried.

The wool so treated has a greater whiteness than material which has been washed without the addition of the product of Example 2.

Example 18

Natural silk is treated at room temperature and a liquor ratio of 1:40 in a bath which contains, per liter, 0.1 gram of the product obtained as described in Example 1 and 1 gram of acetic acid of 40 per cent strength. The material is then rinsed and dried. The silk has a greater whiteness than the untreated material.

Example 19

Natural silk is treated at a liquor ratio of 1:40 for ¼–½ hour in a bath heated at 40–45° C., which contains, per liter, 0.05 gram of 4-methyl-7-dimethylamino-coumarin dissolved in 12 grams of sulfuric acid of 2 per cent. strength. The material is then rinsed and dried.

The silk has a greater whiteness than the untreated material.

Example 20

Bleached cotton cloth is treated on the foulard with a solution which contains 0.4 gram of the product obtained as described in Example 2.

The cotton cloth has a whiter appearance than the untreated material.

Example 21

Cotton yarn is treated at a liquor ratio of 1:30 for about ¼ hour in a bath which contains per liter, 0.1 gram of the product obtained as described in Example 4. After rinsing and drying the cotton yarn has a greater whiteness than the untreated material.

Example 22

Cellulose acetate artificial silk is treated in a bath containing, per liter, 0.025 gram of 4-methyl-7-dimethylamino-coumarin dissolved in 5 grams of sulfuric acid of 2 per cent. strength, and 1.5 grams of the condensation product of oleyl alcohol with about 20 mols of ethylene oxide. The liquor ratio is 1:40. By this treatment the cellulose acetate artificial silk is considerably brightened.

A similar effect is obtained by using, instead of the 4-methyl-7-dimethylamino-coumarin, 0.05 gram of 4-methyl-7-ethylamino-coumarin.

Example 23

Synthetic polyamide fibers, for example, such as are obtainable from hexamethylene diamine and adipic acid, are treated for ½ hour at 45–50° C. in a bath containing, per liter, 0.2 gram of the product obtainable as described in Example 2 and 1 gram of concentrated sulfuric acid. The fibers possess a whiter appearance than the untreated fibers.

Example 24

Upon a cotton fabric dyed with 3 per cent. of Direct Scarlet WG (Schultz, Farbstofftabellen, 7th ed., vol. II, page 88) is printed the following color discharge.

| | Grams |
|---|---|
| Sodium formaldehyde-sulfoxylate | 150 |
| Crystal gum (1:2) | 500 |
| Glycerine | 50 |
| Water | 300 |
| | 1000 |

The printed material is dried, steamed, washed in running water, and again dried.

The material so treated is then after-treated at 20–25° C. and at a liquor ratio of 1:50 for 15 minutes in a bath containing, per liter, 1 gram of the product obtained as described in Example 1.

In this manner the whiteness of the discharged parts is enhanced.

Example 25

To a paper pulp in a hollander and containing 100 parts of paper, are first added 2 parts of resin size and after 15 minutes 4 parts of the product obtained as described in Example 1 dissolved in 80 parts of water. After a further 15 minutes 3 parts of aluminium sulfate are added. The paper pulp so treated is then passed by way of the mixing vat to the paper machine.

The paper treated in this manner has a greater whiteness than the untreated paper.

A similar effect is obtained by using instead of the product of Example 1, 1 gram of the product obtainable as described in Example 2.

Example 26

0.01-0.1 per cent., (calculated on the acetyl cellulose) of the compound described in Example 1 and dissolved in methanol is added to an acetyl-cellulose spinning solution containing about 25 per cent. of acetyl cellulose. The fibers produced from the resulting spinning solution possess a brighter appearance than those obtainable without the use of the above addition.

Example 27

300 parts of a soap mass, containing, for example, 60 parts of fatty acid in the form of soap and 200 parts of water, are stirred at 50° C. with 1 part of the product obtained as described in Example 1 and dissolved in a small quantity of water. After cooling, a soap is obtained which imparts to undyed textile materials in the usual washing operation a whiter appearance than is obtained by using the original soap alone.

Example 28

Anodically oxidized aluminium is treated at 40–80° C. for ¼ to ½ hour in a bath containing 1 gram of the product obtained as described in Example 1, and then dried.

The aluminum so treated exhibits a pronounced blue-violet fluoresence in ultra-violet light.

Example 29

A solution of furfurol bisulfite is prepared from 65 parts of a sodium bisulfite solution of 40 per cent. strength and 25 parts of furfurol. 0.5 part of sodium carbonate and 7 parts of 4-methyl-7-amino-coumarin are added. The whole is boiled in a reflux apparatus until the whole of the 4-methyl-7-amino-coumarin has passed into solution, and it is then filtered to remove small quantities of impurities and allow to cool. The crystal magma so obtained is diluted with sodium chloride solution of 10 per cent. strength, filtered, washed with sodium chloride solution of 10 per cent. strength, and dried. A bright powder of the formula

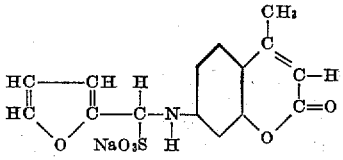

is obtained which dissolves in water to give a blue-violet fluorescence.

Example 30

A solution of 5 parts of 3-benzyl-4-methyl-7-ethyl-amino-coumarin in 50 parts of sulfuric acid monohydrate is allowed to stand for 1 hour. As soon as a test portion is soluble in water which has been rendered alkaline, the whole is poured on to ice-water, a small quantity of sodium chloride is added to complete the precipitation, the precipitated powder is separated by filtration, washed with sodium chloride solution, stirred with water, neutralized with sodium carbonate, and the resulting solution is evaporated to dryness. The sodium salt of sulfonated 3-benzyl-4-methyl-7-ethylamino-coumarin, that is to say of the sulfonic acid of the formula

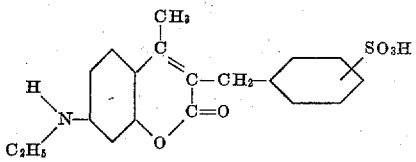

is obtained in the form of a bright powder which is soluble in water.

Its aqueous solutions produce a sky blue fluorescence. By using instead of 3-benzyl-4-methyl-7-ethyl-amino-coumarin, the benzylated amino coumarins mentioned in Example 38 there are obtained water-soluble compounds having similar properties.

Example 31

5 parts of 4-methyl-7-ethylamino-coumarin are stirred with 50 parts of chlorosulfonic acid at 90–95° C. until a test portion is soluble in water which has been rendered alkaline. The whole is allowed to cool, poured on to ice, if necessary, filtered to remove small quantities of starting material, and the filtrate neutralized with an alkaline agent, for example, sodium carbonate, and evaporated to dryness on the water bath. The powder of the formula

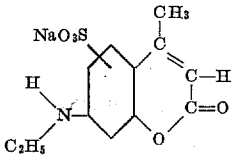

so obtained is soluble in water. Its solutions produce a violet-blue fluorescence.

Example 32

3.5 parts of 4-methyl-7-amino-coumarin and 8 parts of sodium β-bromoethane sulfonate are boiled with 50 parts of ethyl alcohol. The hydrobromic acid formed is neutralized with a solution of 1.3 parts of sodium carbonate in 5 parts of water, and in such manner that a very weakly acid reaction persists throughout. After boiling for 12 hours the whole is diluted with 400 parts of water, neutralized with sulfuric acid of 10 per cent strength, and the solution is evaporated to dryness. A bright powder is obtained which can if necessary, be freed from starting material by means of chlorobenzene. The powder of the formula

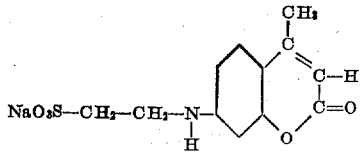

is soluble in water to give a violet-blue fluorescence.

Example 33

8.7 parts of 4-methyl-7-amino-coumarin are dissolved in 80 parts of glacial acetic acid and 3.8 parts of formaldehyde solution of 40 per cent strength by volume. 4.6 parts of thioglycollic acid are added to the solution and the whole is heated for about 1 hour on the water-bath. As soon as dissolution is complete the whole is allowed to cool, the precipitated powder is separated by filtration, the precipitate is washed with glacial acetic acid and water, stirred with 100 parts by volume of water, neutralized with an aqueous solution of sodium carbonate at 40–45° C., filtered to removed small quantities of solid constituents, and the solution is evaporated to dryness at 50–70° C. under reduced pressure.

The resulting powder, the sodium salt of the acid of the formula

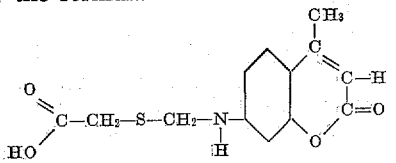

dissolves in water to give a violet fluorescence.

Also the 4-methyl-7-ethylamino-coumarin can be reacted in a similar manner with formaldehyde and thioglycol.

Example 34

4.8 parts of sodium glyoxyllate and 8.7 parts of 4-methyl-7-aminocoumarin are heated with 80 parts of glacial acetic acid for ½ hour at 70° C. As soon as a test portion is soluble in water rendered alkaline with sodium carbonate, the solution is allowed to cool, the precipitated powder is separated by filtration, stirred with 100 parts of water, neutralized with sodium carbonate, filtered, and the filtrate is evaporated to dryness at 40–50° C. under reduced pressure.

The resulting powder dissolves in water. Its solutions give a bluish fluorescence in ultra-violet light.

Example 35

8.7 parts of 4-methyl-7-amino-coumarin and 7.4 parts of phthalic anhydride are stirred with 70 parts of dioxane for 1 hour at 80–85° C. As soon as a test portion is soluble in water rendered alkaline, the dioxane is removed by distillation at 50–60° C. under reduced pressure. The solid residue is stirred at 40–50° C. in 100 parts of water, neutralized with sodium carbonate solution, the small quantities of solid constituents are removed by filtration, and the filtrate is evaporated to dryness at 50–55° C. under reduced pressure.

A pale yellowish powder of the formula

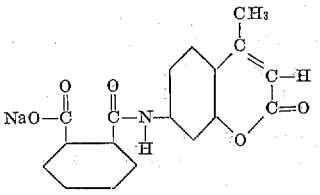

is obtained which is soluble in water. Its solutions produce a bluish fluorescence in ultra-violet light.

A product having similar properties is obtained by using instead of phthalic anhydride an equimolecular quantity of maleic anhydride.

Example 36

10 parts of the powder obtained as described in Example 2 are worked up into a fine homogeneous powder with 40 parts of tartar and 50 parts of anhydrous sodium sulfate. It is soluble in water. By treating textile goods therewith they acquire a whiter appearance than the untreated material. Instead of Glauber salt another anhydrous neutral salt may be used.

The preparation may also be prepared without the use of sodium sulfate. Furthermore, the quantities of the coumarin used and of the tartar may be reduced or increased. Moreover, there may be used, instead of tartar, another solid acid salt which yields a stable preparation with the coumarin used above, for example, the monosodium salt of phthalic acid or of oxalic acid.

Example 37

100 parts of a soap mass, containing, for example, 60 percent. of fatty acid, are stirred with 0.1–3 parts of 4-methyl-7-ethylamino-coumarin. When the mass solidifies a soap-like preparation is obtained. Textile goods washed with this preparation possess a whiter appearance than a material which has been washed only with the soap itself.

For the purpose of more easy dispersion the coumarin derivative may be previously dissolved in a small quantity of alcohol or another solvent miscible with water, and the soap added to the solution in this form. It may also be first mixed with a liquid or molten free fatty acid, and then a soap-like preparation may be prepared in the usual manner by neutralizing the fatty acid.

The 4-methyl-7-ethylamino-coumarin used above can be prepared in a manner similar to that of 4-methyl-7-amino-coumarin. It forms pale yellow crystals which dissolve in alcohol or acetone to give a violet-blue fluorescence.

Instead of 4-methyl-7-ethylamino-coumarin, another coumarin containing an amino group in the 7-position, which may be alkylated or aralkylated, may be used. Mixtures of the foregoing coumarins may also be used.

Example 38

The procedure is the same as that described in Example 37 except that instead of 4-methyl-7-ethylamino-coumarin, use is made of 0.1–3 parts of 3-benzyl-4-methyl-7-ethyl-amino-coumarin of the formula

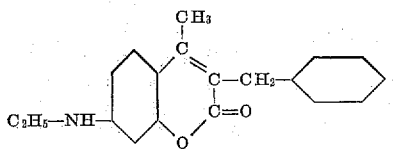

which can be obtained from 1-hydroxy-3-ethylaminobenzene and α-benzyl-acetoacetic acid ethyl ester by analogous processes.

It forms pale crystals which are insoluble in water. It dissolves in alcohol with a bluish fluorescence.

Instead of 3-benzyl-4-methyl-7-ethylamino-coumarin the following coumarins may be used: 3 - benzyl-4:6-dimethyl-7-ethylamino-coumarin, 3-benzyl-4-methyl-7-amino-coumarin or 3-benzyl-4-methyl-7-dimethylamino-coumarin.

These coumarins can also be obtained from the corresponding phenols by analogous processes.

Example 39

The sodium salt of 2-heptadecyl-N-benzylbenzimidazole disulfonic acid is mixed with 0.1–3 per cent. of finely pulverized 4-methyl-7-ethylamino-coumarin. The powder so obtained has a whiter appearance than one not containing 4-methyl-7-ethylamino-coumarin. Undyed textile goods which have been washed in the usual manner with the resulting mixture, have a greater whiteness than material which has been treated with the aforesaid sodium salt alone.

Instead of the above mentioned sodium salt, there may be used an alkali salt of a sulfonic acid of another benzimidazole, which contains a higher alkyl radical, or mixtures of such alkali salts of sulfonated benzimidazoles which contain alkyl residues having chains of various lengths. Furthermore, other coumarins may be used which contain in the 7-position an amino group which may be alkylated or aralkylated. There come into consideration also mixtures with other synthetic washing agents, for example fatty alcohol sulfonates or condensation products of higher fatty acids with aliphatic hydroxy- or amino-sulfonic acids. Also, mixtures of the aforesaid coumarins may be added to synthetic washing agents.

Example 40

1 part of 4-methyl-7-ethylamino-coumarin and 0.01 part of α-[benzimidazyl-(2)]-β-[N-methylbenzimidazyl-(2)]-ethylene dissolved in alcohol are added to a solution of 100 parts of soap in 200 parts of water at 70–75° C. The alcohol is removed by distillation, and the residue is allowed to cool while stirring. A soap-like preparation is obtained. Textile goods washed with this preparation exhibit a whiter appearance than materials which have been washed with soap alone. The quantity of the optical bleaching agent used above may be decreased or increased.

Example 41

The procedure is the same as that described in Example 40, except that, instead of α-[benzimidazyl-(2)-α-[N-methylbenzimidazyl-(2)]-ethylene, there is used α:β-di-[N-methylbenzimidazyl-(2)]-ethylene or a mixture of both ethylenes or also other diimidazoles, for example, those described in French Patent No. 908,852 or U. S. Patent Application Serial No. 630,118, filed November 21, 1945, now U. S. Patent No. 2,488,289 dated Nov. 15, 1945.

Example 42

1–5 parts of the powder prepared as described in Example 36 are covered with 1000 parts of water at 40–50° C., and wool is treated with the solution for about 20 minutes, rinsed and dried.

After this treatment the wool has a greater whiteness.

Example 43

Bleached cloth of regenerated cellulose staple fibers is treated on the foulard with a liquor which contains, in addition to the usual products required for producing an anti-creasing effect, 2.5 grams per liter of the condensation product obtained as described in Example 2.

After working up the material in the usual manner, this treatment produces besides the anti-creasing effect a pronounced brightening of the material.

When using, instead of the condensation product obtained according to Example 2, the sodium salt of the sulfonated 3-benzyl-4-methyl-7-ethylamino-coumarin, a similar effect is obtained.

Example 44

3 parts of 3-(para-acetylamino-phenyl)-coumarin are mixed at 10-20° C. with 30 parts of sulfuric acid monohydrate. 12 parts of fuming sulfuric acid containing 24 per cent of sulfur trioxide are added in drops, the temperature being allowed to rise to 22° C. As soon as a test portion is soluble in dilute sodium carbonate solution, the mixture is poured onto ice, sodium chloride solution is added for the complete separation, the separated sulfonic acid is then filtered, stirred with water, converted into the sodium salt with caustic soda solution, and the solution is then evaporated to dryness. A bright powder is obtained which is soluble in water. The solution produces a bluish fluorescence in the ultra-violet light.

Example 45

15 parts of fuming sulfuric acid containing 24 per cent of sulfur trioxide are added at 15–20° C. to 5 parts of 6-benzoylamino-coumarin and 50 parts of sulfuric acid monohydrate. As soon as a test portion is soluble in dilute sodium carbonate solution, the whole is poured onto ice, the separated sulfonic acid is filtered, stirred with water, converted into the sodium salt with caustic soda solution and the solution is evaporated to dryness.

What I claim is:

1. A water-soluble amino coumarin derivative which forms an aqueous solution showing fluorescence in ultraviolet light and corresponds to the formula

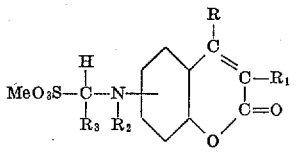

wherein each of R and $R_1$ is a member selected from the group consisting of hydrogen, alkyl, aryl and aralkyl, $R_2$ is a member selected from the group consisting of hydrogen and alkyl, $R_3$ is a member selected from the group consisting of hydrogen, alkyl, aryl and furfuryl, and Me is an alkali metal.

2. A water-soluble amino coumarin derivative which forms an aqueous solution showing fluorescence in ultraviolet light and corresponds to the formula

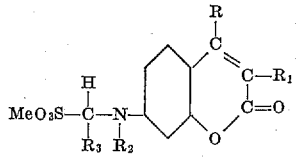

wherein each of R and $R_1$ is a member selected from the group consisting of hydrogen, alkyl, aryl and aralkyl, $R_2$ is a member selected from the group consisting of hydrogen and alkyl, $R_3$ is a member selected from the group consisting of hydrogen, alkyl, aryl and furfuryl, and Me is an alkali metal.

3. A water-soluble amino coumarin derivative which forms an aqueous solution showing fluorescence in ultraviolet light and corresponds to the formula

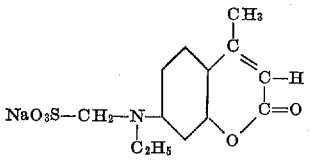

4. A water-soluble amino coumarin derivative which forms an aqueous solution showing fluorescence in ultraviolet light and corresponds to the formula

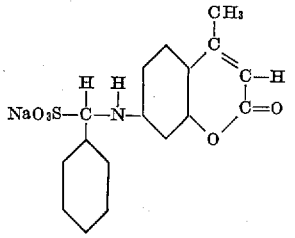

5. A water-soluble amino coumarin derivative which forms an aqueous solution showing fluorescence in ultraviolet light and corresponds to the formula

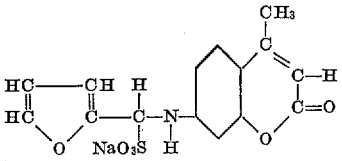

*6. A water soluble aminocoumarin derivative which forms and aqueous solution showing fluorescence in ultraviolet light and corresponds to the formula*

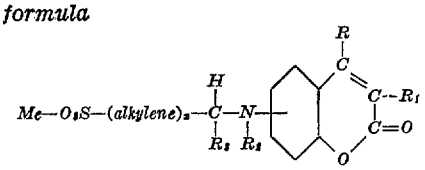

*wherein each of R and $R_1$ is a member selected from the group consisting of hydrogen, alkyl, aryl and aralkyl, $R_2$ is a member selected from the group consisting of hydrogen and alkyl, $R_3$ is a member selected from the group consisting of hydrogen, alkyl, aryl and furfuryl, Me is an alkali metal and x is 0 or 1, $R_3$ being hydrogen when x is 1.*

*7. A water soluble aminocoumarin derivative which forms an aqueous solution showing fluorescence in ultraviolet light and corresponds to the formula*

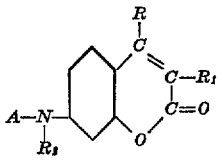

*wherein each of R and $R_1$ is a member selected from the group consisting of hydrogen, alkyl, aryl and aralkyl, $R_2$ is a member selected from the group consisting of hydrogen and alkyl, and A is a lower alkyl-group containing as sole substitutent and $SO_3Me$ group.*

*8. A water soluble aminocoumarin derivative which forms an aqueous solution showing fluorescence in ultraviolet light and corresponds to the formula*

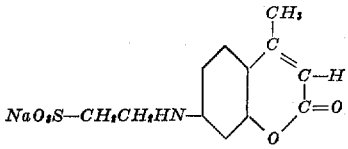

FRANZ ACKERMANN.

References Cited in the file of this patent or the original patent

UNITED STATES PATENTS

| Number | Name | Date |
|---|---|---|
| 2,333,329 | Miglarese | Nov. 2, 1943 |
| 2,334,348 | Miglarese | Nov. 16, 1943 |

OTHER REFERENCES

Pechmann et al.: Ber., Deut. Chem. Gesell, 32, pp. 3696–8 (1899).

Cain and Thorpe: Synthetic Dyestuffs, 6th ed., 1923, p. 10.

Trotman: "Bleaching, Dyeing—Fibres," 2nd ed., 1946, pp. 471–2.